Figure 1:
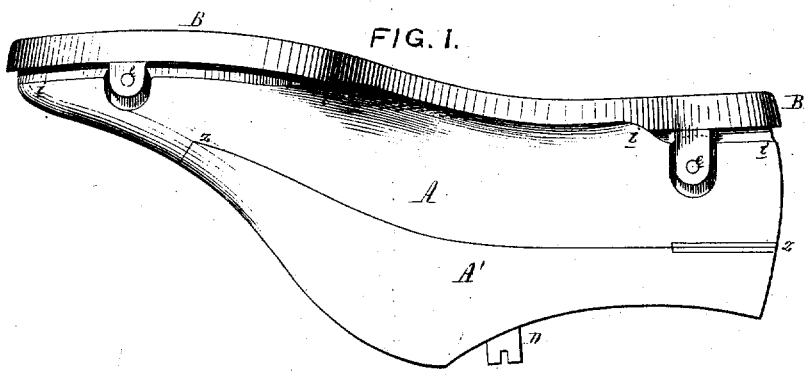

WILLIAM J. B. MILLS.

Shoe Lasts.

No. 4,828. Reissued March 26, 1872.

WITNESSES { Thomas M. Alvain
John Parker

W. J. B. Mills
by his Attys.
Howson & Sons

UNITED STATES PATENT OFFICE.

WILLIAM J. B. MILLS, OF PHILADELPHIA, PENNSYLVANIA, ASSIGNOR TO DE WITT C. TAYLOR, TRUSTEE.

IMPROVEMENT IN SHOE-LASTS.

Specification forming part of Letters Patent No. 123,116, dated January 30, 1872; antedated January 14, 1872; reissue No. 4,828, dated March 26, 1872.

SPECIFICATION.

I, WILLIAM J. B. MILLS, of the city of Philadelphia and State of Pennsylvania, have invented certain Improvements in Lasts for Turn-Round and Welted Shoes, of which the following is a specification:

The object of my invention is the holding of the sole securely to the last without the use of tacks while sewing turn-round or welted shoes, thereby preventing the rapid wearing of the last, and also obviating the necessity of nailing the upper to the inner sole, as is done in machine shoes, a further object of my invention being to sew with a machine in the same manner as in hand-made shoes. The nature of the invention consists, mainly, of a metallic band or clasp connected with the last to receive the sole and hold it in position while the upper is being sewed to the same. The band or clasp is so adapted to the last as to be moved from the same until the sole is placed in position, and then drawn toward the last to clasp the sole thereon.

In the particular form of last and clasp represented in the drawing there is a screw connected with a longitudinal bar inside of the last for operating the band or clasp, which has a lip around the inner edge for bearing on the border of the sole in the clasping operation. Other well-known means may be used for operating the band or clasp for receiving the sole, then bringing it into position for receiving the sole, and then confining it to the last. The band or clasp I usually make of a continuous piece of metal; it may, however, be made in links or sections, or in any other convenient manner; or it may be made of any material of sufficient cohesive strength and firmness. The last represented is constructed with a detachable block, which extends from the rear to within a short distance from the front end for the double purpose of connecting the operating parts with the interior and facilitating the withdrawal of the last from the shoe to prevent the breaking of the front and back of the upper. The rear ends of the last and block are provided each with an eye for the insertion of a hook for their withdrawal from the shoe.

Figure 2:
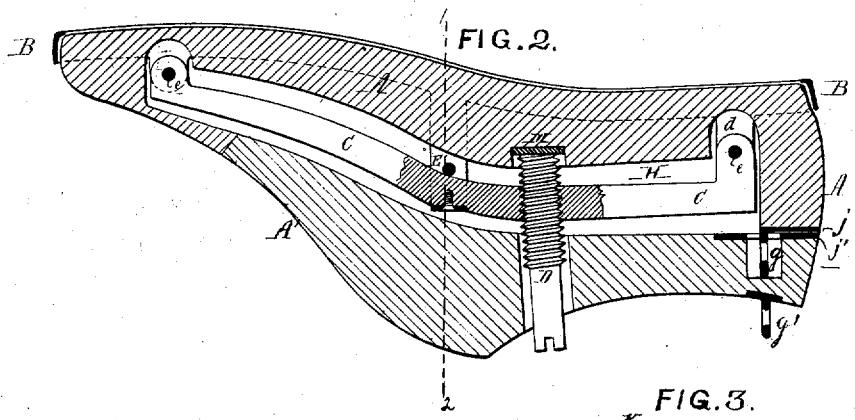
Figure 5:
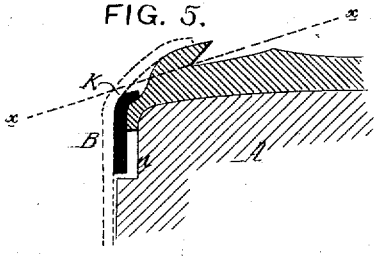
Figure 3:
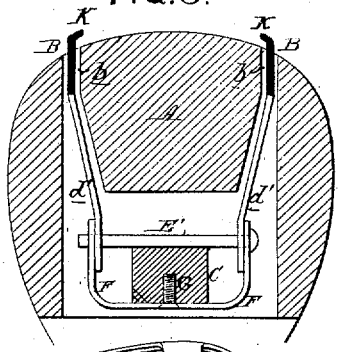
Figure 4:
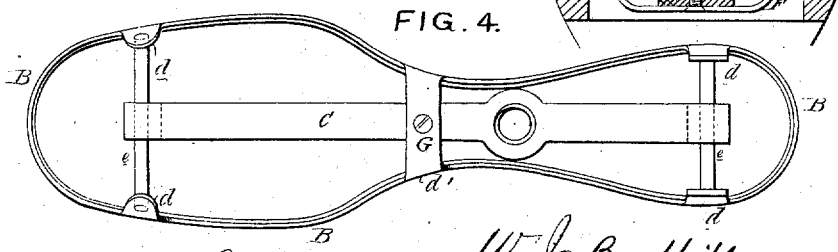

In the accompanying drawing which forms a part of this specification, Figure 1 is an exterior view of one of the forms of my improved clasp and last; Fig. 2, a longitudinal section of the same; Fig. 3, a transverse section of the last drawn to an enlarged scale on the line 1 2; Fig. 4, a plan view of the band or clasp and its appliances; and Fig. 5, an enlarged sectional view, illustrating the manner in which the sole is confined by the clasp or band to the last, and the usual direction of the needle or awl.

A represents a form of last, and B a form of clasp or band for holding the sole in position. C is a longitudinal bar, connected with the band or clasp, and D a screw for adjusting the same. The last A has rebates *a a* between the points *i i*, where the band or clasp is flush with it and with grooves *b b* at the projecting parts of the last for the reception of the band or clasp, which is provided with pairs of ears *d d* and *d′ d′*, connected to the longitudinal bar *c* by means of horizontal pins *e e*, which pass through the said ears and through lugs *f f*, which project from the bar. The ears *d′ d′* in the middle of the clasp or band are connected to the bar by means of rods E′, yoke F, and screw G, the latter securing the middle of the yoke to the bar, and the rod connecting the ends of the former to the ears, as represented in the drawing. A′ is the block, which is separated from the main portion of the last at the line *z z*, to admit of the insertion of the bar C in the mortise H and its connections with the band or clasp B, and also to facilitate the removal of the last, as before specified. The heel part of the last is provided with an eye, *g*, for the insertion of a hook to withdraw it from the shoe. The eye may be attached to the band *j*, which protects the rear end of the last at the joint *z z*. The block A′ has a like band, *j′*, to prevent its rapid wearing. The block A′ has also an eye, *g′*, formed by means of a bent wire, whose ends are connected with the block for its withdrawal from the shoe. The band or clasp B and parts attached are shown in Fig. 4. The screw D is manipulated until the clasp or band B is projected far enough from the last to receive the sole L. Then the screw is reversed, its inner end bearing against the washer M until the lip K of the clasp or band turns down the border of the sole, as shown in Fig. 3, and confines the sole to the last. The sole is thus held securely in position, and is ready to be sewed either by machine or by hand to the upper. When the sewing is completed the screw D is slackened, the block A′ of the last is then removed, and the last withdrawn from the shoe by means of a hook inserted in the eye *g*.

I claim as my invention—

1. The combination, substantially as described, of a last, A, with a band or clasp, B.

2. The combination of a last, A, with a band or clasp, B, to which a sliding motion over the last may be imparted, substantially in the manner described.

3. The combination, with the last and said band or clasp, of a longitudinal bar, C, connected to the latter and controlled by a screw, D, or its equivalent, substantially in the manner described.

4. The longitudinal division of the last in line with the bar C, for the connection of the bar with the band B, substantially as described.

5. The construction of the heel parts of the pieces A and A′ of the last with eye-pieces *g* and *g′*, respectively, for facilitating the withdrawal of the same from the shoe, as above specified.

In testimony whereof I have signed my name to this specification in the presence of two subscribing witnesses.

WILLIAM J. B. MILLS.

Witnesses:
WM. A. STEEL,
HARRY SMITH.